United States Patent
Philipp et al.

(10) Patent No.: US 12,528,500 B2
(45) Date of Patent: Jan. 20, 2026

(54) SYSTEM AND METHOD FOR PLANNING A PATH FOR A VEHICLE

(71) Applicant: GM GLOBAL TECHNOLOGY OPERATIONS LLC, Detroit, MI (US)

(72) Inventors: Tzvi Philipp, Bet Shemesh (IL); Eran Kishon, Hod Hasharon (IL)

(73) Assignee: GM Global Technology Operations LLC, Detroit, MI (US)

( * ) Notice: Subject to any disclaimer, the term of this patent is extended or adjusted under 35 U.S.C. 154(b) by 241 days.

(21) Appl. No.: 18/324,333

(22) Filed: May 26, 2023

(65) Prior Publication Data
US 2024/0391489 A1     Nov. 28, 2024

(51) Int. Cl.
*B60W 60/00* (2020.01)
*B60W 40/04* (2006.01)
*G06V 20/58* (2022.01)

(52) U.S. Cl.
CPC .......... *B60W 60/001* (2020.02); *B60W 40/04* (2013.01); *G06V 20/58* (2022.01); *B60W 2420/403* (2013.01); *B60W 2420/408* (2024.01); *B60W 2554/4042* (2020.02); *B60W 2554/4046* (2020.02)

(58) Field of Classification Search
CPC ....... B60W 60/001; B60W 2554/4042; B60W 40/04; G06V 20/58
See application file for complete search history.

(56) References Cited

U.S. PATENT DOCUMENTS

| | | | |
|---|---|---|---|
| 9,495,874 B1* | 11/2016 | Zhu | B60W 60/00133 |
| 9,884,628 B1* | 2/2018 | Grant | B60W 40/08 |
| 2008/0084283 A1* | 4/2008 | Kalik | B60Q 9/00 701/301 |
| 2013/0179382 A1* | 7/2013 | Fritsch | G08G 1/161 706/46 |
| 2014/0236414 A1* | 8/2014 | Droz | G06V 20/58 701/1 |
| 2016/0347309 A1* | 12/2016 | Vijayan | G08G 1/166 |
| 2020/0086882 A1* | 3/2020 | Kodali | B60W 40/09 |
| 2020/0216075 A1* | 7/2020 | Park | G06V 10/764 |
| 2022/0111867 A1* | 4/2022 | Trask | B60W 40/09 |
| 2022/0355802 A1* | 11/2022 | Chaves | B60W 40/09 |
| 2023/0085789 A1* | 3/2023 | Maier | B60W 60/001 701/23 |

* cited by examiner

*Primary Examiner* — Kenneth M Dunne
(74) *Attorney, Agent, or Firm* — Quinn IP Law

(57) ABSTRACT

A method includes receiving perception images of an area surrounding the vehicle with at least one sensor and detecting at least one perception task from the perception images with the at least one perception task identifying at least one neighboring vehicle. The method calculates a risk factor for the at least one neighboring vehicle by recognizing a behavior of the at least one neighboring vehicle from the perception images and plans the path for the vehicle based on the at least one perception task and the risk factor. The path is then executed for the vehicle.

20 Claims, 3 Drawing Sheets

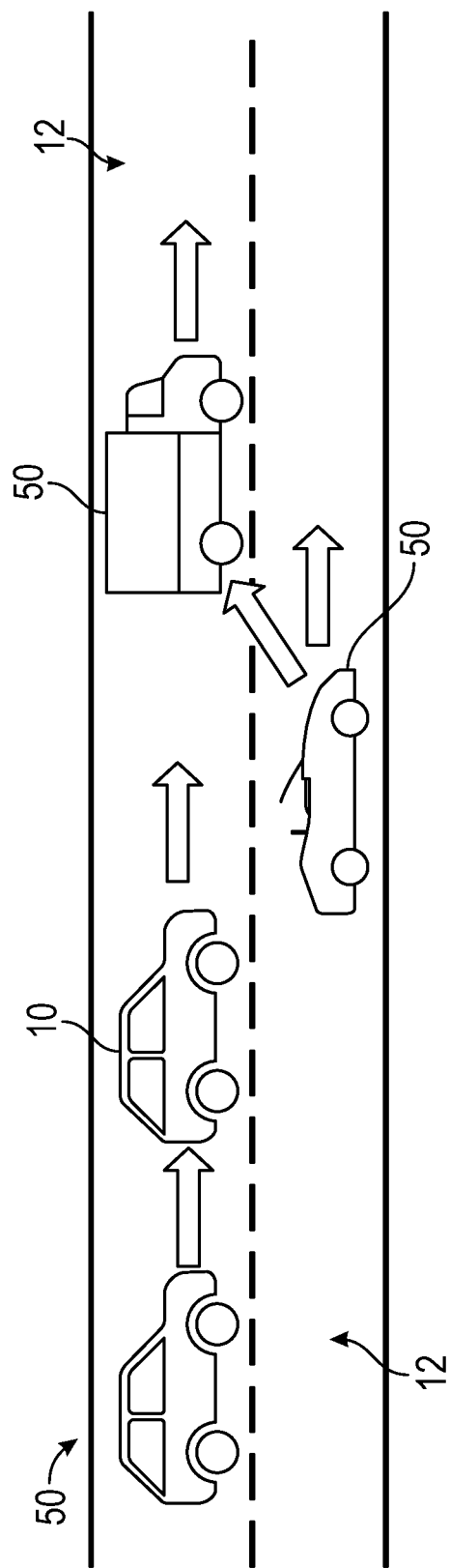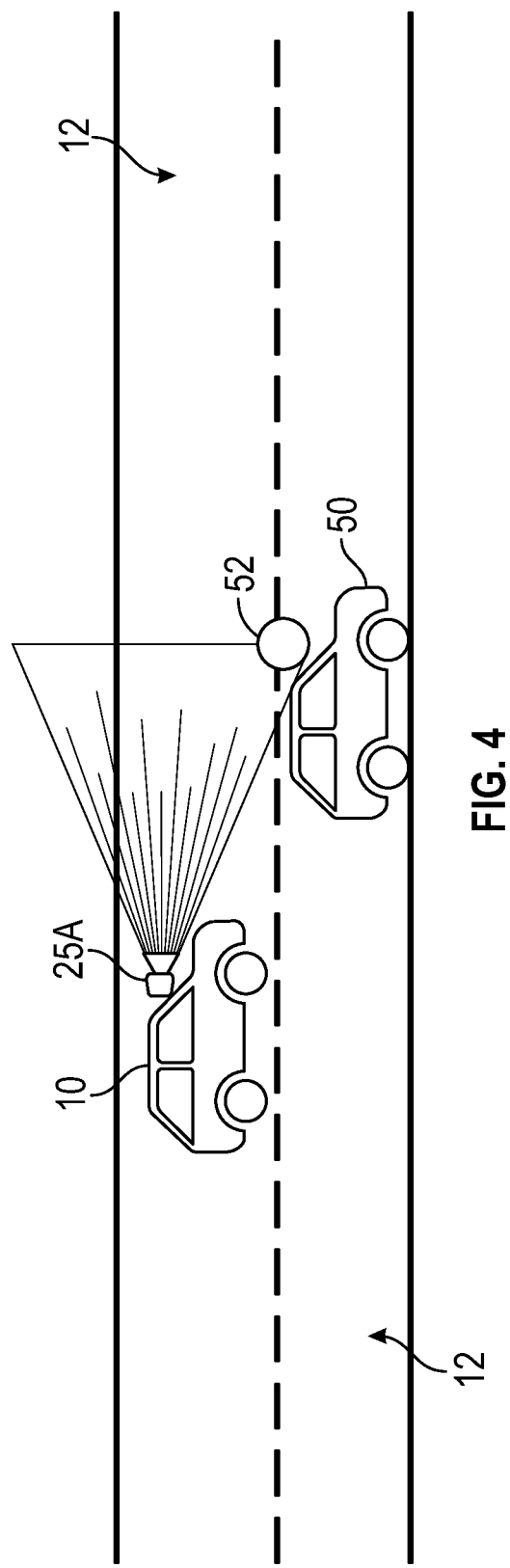

SYSTEM AND METHOD FOR PLANNING A PATH FOR A VEHICLE

INTRODUCTION

The present disclosure relates to a system and a method for path planning of autonomous vehicles.

Autonomous vehicles include sensors, such as lidar, radar, and cameras, operable to detect vehicle operation and the environment surrounding the vehicle, and a computing device operable to control aspects of vehicle operation. Autonomous vehicles generally employ a vehicle navigation system integrated with vehicle controls, drive-by-wire systems, vehicle-to-vehicle communication, and/or vehicle-to-infrastructure technology to identify vehicle position and navigate the vehicle.

Typically, a vehicle navigation system uses a global positioning system (GPS) system to obtain its position data, which is then correlated to the vehicle's position relative to a surrounding geographical area. Based on the GPS signal, when directions to a specific waypoint are needed, routing to such a destination may be calculated, thereby determining a vehicle path. Specifically, the vehicle sensors and the computing device may cooperate to identify intermediate way points and maneuver the vehicle between such way points to maintain the vehicle on the selected path.

While maneuvering the autonomous vehicle along a selected path, the vehicle may encounter a number of other vehicles, such as non-autonomously operated vehicles, along the roadway. Other vehicles, such as non-autonomously operated vehicles, may not follow traffic laws and practices.

SUMMARY

A method of planning a path for a vehicle is disclosed herein. The method includes receiving perception images of an area surrounding the vehicle with at least one sensor and detecting at least one perception task from the perception images with the at least one perception task identifying at least one neighboring vehicle. The method calculates a risk factor for the at least one neighboring vehicle by recognizing a behavior of the at least one neighboring vehicle from the perception images and plans the path for the vehicle based on the at least one perception task and the risk factor. The path is then executed for the vehicle.

Another aspect of the disclosure may be a method where the vehicle is an autonomous motor vehicle.

Another aspect of the disclosure may be a method where the behavior of the at least one neighboring vehicle includes a driver operating with an elevated risk behavior.

Another aspect of the disclosure may be a method where calculating the risk factor for the at least one neighboring vehicle includes mapping the behavior of the at least one neighboring vehicle onto at least one risk-related cluster.

Another aspect of the disclosure may be a method where calculating the risk factor for the at least one neighboring vehicle includes performing a behavior risk calculation based on the at least one risk-related cluster.

Another aspect of the disclosure may be a method where mapping the behavior of the at least one neighboring vehicle onto the at least one risk-related cluster includes determining a likelihood that a future behavior of the at least one neighboring vehicle will include an elevated risk.

Another aspect of the disclosure may be a method where the behavior of the at least one neighboring vehicle includes a change in speed that exceeds a predetermined threshold.

Another aspect of the disclosure may be a method where the behavior of the at least one neighboring vehicle includes changing vehicle lanes without signaling.

Another aspect of the disclosure may be a method where the behavior of the at least one neighboring vehicle includes occupying multiple vehicle lanes on a roadway more than a predetermined length of time.

Another aspect of the disclosure may be a method where the behavior of the at least one neighboring vehicle includes illuminating a blind-spot indicator on the vehicle.

Another aspect of the disclosure may be a method where planning the path for the vehicle includes directing the vehicle to a position on a vehicle lane such that the blind-spot indicator on the at least one neighboring vehicle is no longer activated.

Another aspect of the disclosure may be a method where planning the path for the vehicle includes having the vehicle remain in a current lane on the roadway until the neighboring vehicle exceeds a predetermined threshold.

Another aspect of the disclosure may be a method where the at least one perception task includes detecting a lane in the plurality of perception images.

Another aspect of the disclosure may be a method where the at least one sensor includes a camera.

Another aspect of the disclosure may be a method where the at least one sensor includes at least one of a lidar sensor or a radar sensor.

As disclosed herein, a non-transitory computer-readable storage medium embodying programmed instructions which, when executed by a processor, are operable for performing a method. The method includes receiving perception images of an area surrounding the vehicle with at least one sensor and detecting at least one perception task from the perception images with the at least one perception task identifying at least one neighboring vehicle. The method calculates a risk factor for the at least one neighboring vehicle by recognizing a behavior of the at least one neighboring vehicle from the perception images and plans the path for the vehicle based on the at least one perception task and the risk factor. The path is then executed for the vehicle.

As disclosed herein, a vehicle system includes a drivetrain, a power source in communication with the drivetrain, a plurality of sensors, and a controller in communication with the plurality of sensors. The controller is configured to receive perception images of an area surrounding the vehicle with the at least one sensor and detect at least one perception task from the perception images with the at least one perception task identifying at least one neighboring vehicle. The controller is configured to calculate a risk factor for the at least one neighboring vehicle by recognizing a behavior of the at least one neighboring vehicle from the perception images and planning the path for the vehicle based on the at least one perception task and the risk factor. The path is then executed for the vehicle.

BRIEF DESCRIPTION OF THE DRAWINGS

FIG. 3 schematically illustrates the autonomous motor vehicle on a roadway surrounded by a plurality of neighboring vehicles.

FIG. 4 illustrates the autonomous motor vehicle of FIG. 1 on another roadway adjacent to another neighboring vehicle.

Figure 1:
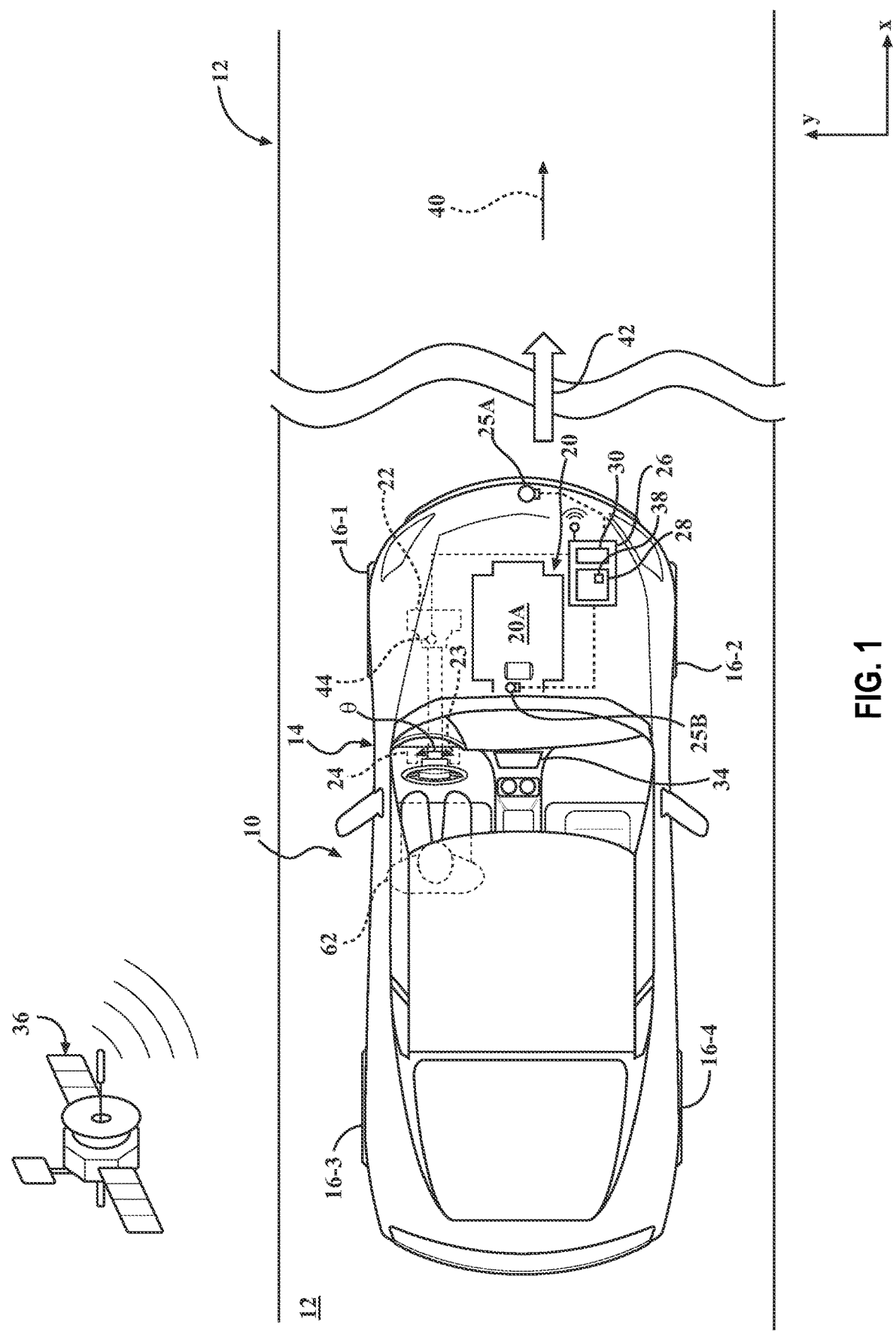
FIG. 1 is a schematic illustration of an example autonomous motor vehicle.

The present disclosure may be modified or embodied in alternative forms, with representative embodiments shown in the drawings and described in detail below. The present disclosure is not limited to the disclosed embodiments. Rather, the present disclosure is intended to cover alternatives falling within the scope of the disclosure as defined by the appended claims.

DETAILED DESCRIPTION

Those having ordinary skill in the art will recognize that terms such as "above," "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may include a number of hardware, software, and/or firmware components configured to perform the specified functions.

Referring to the FIGS., wherein like numerals indicate like parts referring to the drawings, wherein like reference numbers refer to like components, FIG. 1 shows a schematic view of a motor vehicle 10 positioned relative to a road surface, such as a vehicle lane 12. As shown in FIG. 1, the vehicle 10 includes a vehicle body 14, a first axle having a first set of road wheels 16-1, 16-2, and a second axle having a second set of road wheels 16-3, 16-4 (such as individual left-side and right-side wheels on each axle). Each of the road wheels 16-1, 16-2, 16-3, 16-4 employs tires configured to provide fictional contact with the vehicle lane 12. Although two axles, with the respective road wheels 16-1, 16-2, 16-3, 16-4, are specifically shown, nothing precludes the motor vehicle 10 from having additional axles.

As shown in FIG. 1, a vehicle suspension system operatively connects the vehicle body 14 to the respective sets of road wheels 16-1, 16-2, 16-3, 16-4 for maintaining contact between the wheels and the vehicle lane 12, and for maintaining handling of the motor vehicle 10. The motor vehicle 10 additionally includes a drivetrain 20 having a power-source or multiple power-sources 20A, which may be an internal combustion engine (ICE), an electric motor, or a combination of such devices, configured to transmit a drive torque to the road wheels 16-1, 16-2 and/or the road wheels 16-3, 16-4. The motor vehicle 10 also employs vehicle operating or control systems, including devices such as one or more steering actuators 22 (for example, an electrical power steering unit) configured to steer the road wheels 16-1, 16-2, a steering angle (θ), an accelerator device 23 for controlling power output of the power-source(s) 20A, a braking switch or device 24 for retarding rotation of the road wheels 16-1 and 16-2 (such as via individual friction brakes located at respective road wheels), etc.

As shown in FIG. 1, the motor vehicle 10 includes at least one sensor 25A and an electronic controller 26 that cooperate to at least partially control, guide, and maneuver the vehicle 10 in an autonomous mode during certain situations. As such, the vehicle 10 may be referred to as an autonomous vehicle. To enable efficient and reliable autonomous vehicle control, the electronic controller 26 may be in operative communication with the steering actuator(s) 22 configured as an electrical power steering unit, accelerator device 23, and braking device 24. The sensors 25A of the motor vehicle 10 are operable to sense the vehicle lane 12 and monitor a surrounding geographical area and traffic conditions proximate the motor vehicle 10.

The sensors 25A of the vehicle 10 may include, but are not limited to, at least one of a Light Detection and Ranging (LIDAR) sensor, radar, and camera located around the vehicle 10 to detect the boundary indicators, such as edge conditions, of the vehicle lane 12. The type of sensors 25A, their location on the vehicle 10, and their operation for detecting and/or sensing the boundary indicators of the vehicle lane 12 and monitor the surrounding geographical area and traffic conditions are understood by those skilled in the art, are not pertinent to the teachings of this disclosure, and are therefore not described in detail herein. The vehicle 10 may additionally include sensors 25B attached to the vehicle body and/or drivetrain 20.

The electronic controller 26 is disposed in communication with the sensors 25A of the vehicle 10 for receiving their respective sensed data related to the detection or sensing of the vehicle lane 12 and monitoring of the surrounding geographical area and traffic conditions. The electronic controller 26 may alternatively be referred to as a control module, a control unit, a controller, a vehicle 10 controller, a computer, etc. The electronic controller 26 may include a computer and/or processor 28, and include software, hardware, memory, algorithms, connections (such as to sensors 25A and 25B), etc., for managing and controlling the operation of the vehicle 10. As such, a method, described below and generally represented in FIG. 3, may be embodied as a program or algorithm partially operable on the electronic controller 26. It should be appreciated that the electronic controller 26 may include a device capable of analyzing data from the sensors 25A and 25B, comparing data, making the decisions required to control the operation of the vehicle 10, and executing the required tasks to control the operation of the vehicle 10.

The electronic controller 26 may be embodied as one or multiple digital computers or host machines each having one or more processors 28, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics. The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a flexible disk, hard disk, magnetic tape or other magnetic medium, a CD-ROM, DVD, and/or other optical medium, as well as other possible memory devices such as flash memory.

The electronic controller 26 includes a tangible, non-transitory memory 30 on which computer-executable instructions, including one or more algorithms, are recorded for regulating operation of the motor vehicle 10. The subject algorithm(s) may specifically include an algorithm configured to monitor localization of the motor vehicle 10 and determine the vehicle's heading relative to a mapped vehicle trajectory on a particular road course to be described in detail below.

The motor vehicle 10 also includes a vehicle navigation system 34, which may be part of integrated vehicle controls, or an add-on apparatus used to find travel direction in the vehicle. The vehicle navigation system 34 is also operatively connected to a global positioning system (GPS) 36 using an earth orbiting satellite. The vehicle navigation system 34 in connection with the GPS 36 and the above-mentioned sensors 25A may be used for automation of the vehicle 10. The electronic controller 26 is in communication with the GPS 36 via the vehicle navigation system 34. The vehicle navigation system 34 uses a satellite navigation device (not shown) to receive its position data from the GPS 36, which is then correlated to the vehicle's position relative to the surrounding geographical area. Based on such information, when directions to a specific waypoint are needed, routing to such a destination may be mapped and calculated. On-the-fly terrain and/or traffic information may be used to adjust the route. The current position of a vehicle 10 may be calculated via dead reckoning—by using a previously determined position and advancing that position based upon given or estimated speeds over elapsed time and course by way of discrete control points.

The electronic controller 26 is generally configured, i.e., programmed, to determine or identify localization 38 (current position in the X-Y plane, shown in FIG. 1), velocity, acceleration, yaw rate, as well as intended path 40, and heading 42 of the motor vehicle 10 on the vehicle lane 12. The localization 38, intended path 40, and heading 42 of the motor vehicle 10 may be determined via the navigation system 34 receiving data from the GPS 36, while velocity, acceleration (including longitudinal and lateral g's), and yaw rate may be determined from vehicle sensors 25B. Alternatively, the electronic controller 26 may use other systems or detection sources arranged remotely with respect to the vehicle 10, for example a camera, to determine localization 38 of the vehicle relative to the vehicle lane 12.

As noted above, the motor vehicle 10 may be configured to operate in an autonomous mode guided by the electronic controller 26 to transport an occupant 62. In such a mode, the electronic controller 26 may further obtain data from vehicle sensors 25B to guide the vehicle along the desired path, such as via regulating the steering actuator 22. The electronic controller 26 may be additionally programmed to detect and monitor the steering angle (θ) of the steering actuator(s) 22 along the desired path 40, such as during a negotiated turn. Specifically, the electronic controller 26 may be programmed to determine the steering angle (θ) via receiving and processing data signals from a steering position sensor 44 (shown in FIG. 1) in communication with the steering actuator(s) 22, accelerator device 23, and braking device 24.

Figure 2:
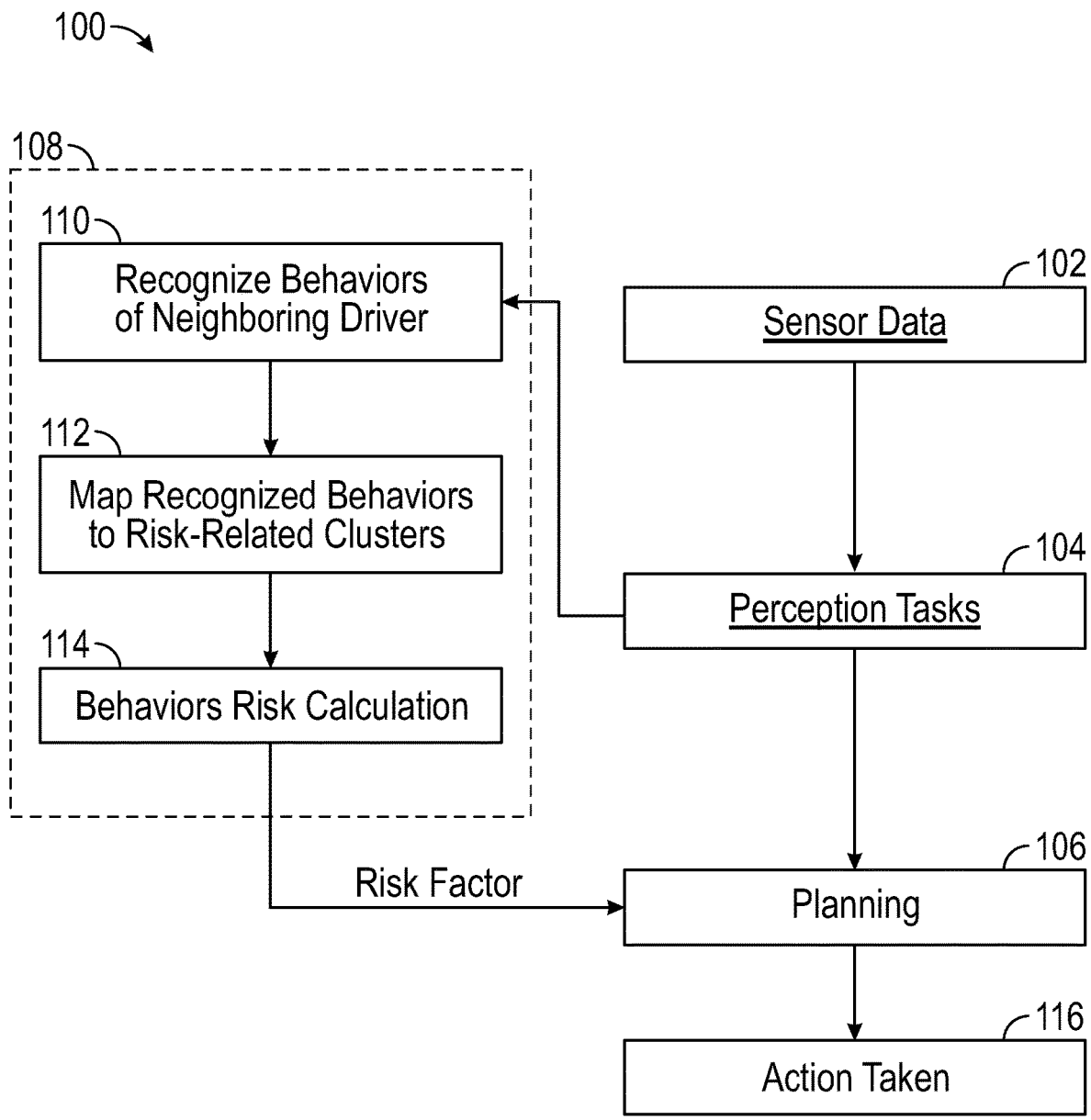
FIG. 2 illustrates an example method of planning a path for the motor vehicle in FIG. 1.

FIG. 2 illustrates an example method 100 of planning a path for the motor vehicle 10. The method 100 receives sensor data from at least one of the sensors 25A, 25B on the motor vehicle 10 at Block 102. In one example, the sensor data includes a plurality of perceptions images of an area surrounding the motor vehicle 10. The at least one sensor 25A, 25B can provide at least one of a forward field of view, lateral side fields of view, or a rear field of view around the motor vehicle 10. Furthermore, the at least one sensor 25A, 25B can include a camera that has an overlapping field of with one or more of the radar sensor or the lidar sensor. This can allow perception images taken by the camera, the radar sensor, or the lidar to be correlated such that the radar and lidar can track physical movements of the neighboring vehicle 50 and the camera can identify physical movements and other behaviors. The other behaviors identified by the camera can include an operating turn signal, an active blind spot monitor, or an eye position of the driver of the neighboring vehicle 54. The use of radar or lidar sensors can be used to track physical changes in the neighboring vehicle, such as changes in speed, position on a road surface, or maneuvering behaviors as discussed further below.

The method 100 evaluates at least one perception task (Block 104) from the sensor data received from Block 102. The perception tasks can include detecting neighboring vehicles, pedestrians, obstacles, vehicle lanes, or other path attributes used when planning a vehicle path. The perception task from Block 104 provides one source of information for the path planning at Block 106. In addition to utilizing the perception tasks when planning the motor vehicle path at Block 106, the method 100 calculates a risk factor (Block 108) of a driver of each of the neighboring vehicles based on information received from the sensor data that also provides input into the planning the motor vehicle path at Block 106.

The method 100 calculates the risk factor for the driver of each of the neighboring vehicles based on the perception tasks (Block 104) and sensor data (Block 102). To calculate and assign the risk factor to a driver of each of the neighboring vehicles, the method 100 monitors each of the neighboring vehicles over a predetermined length of time through the plurality of perception images or perception tasks to recognize a behavior of the driver (Block 110). In one example, the predetermined length of time extends until a present time for the motor vehicle 10. Also, the neighboring vehicle may be autonomously operated such that the driver is not a person but the automated system in that vehicle.

The method 100 can recognize a number of driver behaviors having an elevated risk, such as rapid acceleration or deceleration more than a predetermined threshold value of change, changing vehicle lanes 12 without signaling, occupying multiple vehicle lanes 12 more than a predetermined length of time, or maneuvering the neighboring vehicle 50 within a predetermined distance of other neighboring vehicles 50. Also, the method 100 can recognize other characteristics of neighboring vehicles such as an illuminated blind-spot monitor 52 indicating that the motor vehicle 10 is within the blind spot of one of the neighboring vehicle (See FIG. 4) or if a number of lanes changes by one of the neighboring vehicle exceeds a threshold of lane changes within a predetermined time period.

Once the method 100 has recognized the behavior of the neighboring vehicle 10, the method 100 can map the detected behavior(s) of each of the neighboring vehicles 52 onto at least one risk-related cluster (Block 112). The at least one risk-related cluster assigns a level of risk to the driver to assist in predicting a future behavior of that driver and how that future behavior might influence the motor vehicle 10. In one example, the risk-related clusters could include predetermined risk values for each of the behaviors recognized at Block 108. Therefore, if a driver of the neighboring vehicle is exhibiting dangerous behaviors such as speeding, rapid lane changes, changing lanes without signaling, etc., that driver will be assigned a higher predetermined risk value than a risk value for a driver that maintains the speed limit and signals when making lane changes.

When the method 100 has mapped the behavior onto one of the risk-related clusters corresponding to the behavior recognized, the method 100 can perform a behavior risk calculation for the neighboring vehicle(s) based on the risk-related cluster(s) at Block 114. The behavior calculation assigns a risk factor that is assigned to a corresponding one of the neighboring vehicle(s) based on the risk value(s) from the risk-related clusters. The risk factor provides a statistical likelihood that a future behavior by the driver of the neighboring vehicle will pose a risk to the motor vehicle 10 as it is traveling along a vehicle lane 12.

The method 100 can use the risk factor from Block 108 in addition to the perceptions task from Block 104 when planning the path of the motor vehicle 10 at Block 106. If the risk factor calculated for the driver of the neighboring vehicle is high, the planning Block 106 will plan a path for the motor vehicle 10 that will attempt to avoid the neighboring vehicle or maintain a vehicle path in an existing vehicle lane 12 until the neighboring vehicle with the high-risk factor is outside of a predetermined distance from the motor vehicle 10. Alternatively, if two or more possible paths for the motor vehicle 10 are equally as beneficial to reaching a desired destination for the motor vehicle 10 but for the driver of the neighboring vehicle exhibiting a risky behavior, the method 100 will plan a path to avoid the neighboring vehicle.

In another example, the recognized behavior may include a blind-spot monitor activated on the neighboring vehicle as shown in FIG. 4 such that the driver of the neighboring vehicle is operating with the motor vehicle 10 in its blind spot. The method 100 can then combine the information gathered from the perception tasks with the risk factor calculated from recognizing that the blind spot of the neighboring vehicle is activated. With the information, the method 100 can plan a path for the motor vehicle 10 outside of the blind spot of the neighboring vehicle at Block 106.

Therefore, the risk factor can be used to reinforce a derived expected behavior from the immediate perception observations recorded in the plurality of perception images. The behavior(s) of the driver of each of the neighboring vehicles that are recognized and identified as potentially dangerous affect the immediate planning path selected by the motor vehicle 10. This input to plan the path of the motor vehicle 10 can potentially improve path planning by providing similar decision-making abilities as would be considered by a non-autonomously driven vehicle.

Once the method 100 has planned the path, the method 100 can then execute the path for the motor vehicle 10 at Block 116. The method 100 can be continuously performed for each of the neighboring vehicles identified from the perception images to update the path planned for the motor vehicle 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of planning a path for a vehicle, the method comprising:
   receiving a plurality of perception images of an area surrounding the vehicle with at least one sensor;
   detecting at least one perception task from the plurality of perception images, wherein the at least one perception task includes identifying at least one neighboring vehicle;
   calculating a risk factor for the at least one neighboring vehicle, wherein the risk factor provides a statistical likelihood that a future behavior of the at least one neighboring vehicle will pose an elevated risk to the vehicle and calculating the risk factor includes:
      recognizing a behavior of the at least one neighboring vehicle detected from the at least one perception task identified from the plurality of perception images;
      mapping the behavior of the at least one neighboring vehicle onto at least one of a plurality of risk-related clusters to determine the statistical likelihood that a future behavior of the at least one neighboring vehicle will pose the elevated risk; and
      performing a behavior risk calculation to assign the risk factor based on at least one vehicle risk value associated with the at least one of the plurality of risk-related clusters;
   planning the path for the vehicle based on the at least one perception task and the risk factor for the at least one neighboring vehicle; and
   executing the path for the vehicle, wherein the vehicle is an autonomous motor vehicle.

2. The method of claim 1, wherein the behavior of the at least one neighboring vehicle detected from the at least one perception task includes a change in speed that exceeds a predetermined threshold.

3. The method of claim 1, wherein the behavior of the at least one neighboring vehicle detected from the at least one perception task includes changing vehicle lanes without signaling.

4. The method of claim 1, wherein the behavior of the at least one neighboring vehicle detected from the at least one perception task includes occupying multiple vehicle lanes on a road surface more than a predetermined length of time.

5. The method of claim 1, wherein the behavior of the at least one neighboring vehicle detected from the at least one perception task includes a blind-spot indicator being illuminated on the at least one neighboring vehicle.

6. The method of claim 5, wherein planning the path for the vehicle when the behavior of the at least one neighboring vehicle includes the blind-spot indicator being illuminated by directing the vehicle to a position on a vehicle lane where the blind-spot indicator on the at least one neighboring vehicle is no longer illuminated.

7. The method of claim 1, wherein planning the path for the vehicle includes having the vehicle remain in a current lane on a road surface until the neighboring vehicle exceeds a predetermined threshold distance from the vehicle.

8. The method of claim 1, wherein the at least one perception task includes detecting a lane in the plurality of perception images and the at least one sensor includes at least one of a camera, a lidar sensor, or a radar sensor.

9. The method of claim 1, wherein the behavior of the at least one neighboring vehicle detected from the at least one perception task includes the at least one neighboring vehicle performing a predetermined number of lane changes within a predetermined length of time.

10. The method of claim 1, wherein planning the path for the vehicle is based on the at least one perception task and the risk factor for the at least one neighboring vehicle includes selecting one of a plurality of possible paths that are each equally beneficial for the vehicle to reach a desired destination that maintains a predetermined distance from the at least one neighboring vehicle.

11. A non-transitory computer-readable storage medium embodying programmed instructions which, when executed by a processor, are operable for performing a method comprising:
receiving a plurality of perception images of an area surrounding a vehicle with at least one sensor;
detecting at least one perception task from the plurality of perception images, wherein the at least one perception task includes identifying at least one neighboring vehicle;
calculating a risk factor for the at least one neighboring vehicle, wherein the risk factor provides a statistical likelihood that a future behavior of the at least one neighboring vehicle will pose an elevated risk to the vehicle and calculating the risk factor includes:
recognizing a behavior of the at least one neighboring vehicle detected from the at least one perception task identified from the plurality of perception images;
mapping the behavior of the at least one neighboring vehicle onto at least one of a plurality of risk-related clusters to determine the statistical likelihood that a future behavior of the at least one neighboring vehicle will pose the elevated risk; and
performing a behavior risk calculation to assign the risk factor based on at least one vehicle risk value associated with the at least one of the plurality of risk-related clusters;
planning a path for the vehicle based on the at least one perception task and the risk factor for the at least one neighboring vehicle; and
executing the path for the vehicle, wherein the vehicle is an autonomous motor vehicle.

12. The non-transitory computer readable storage medium of claim 11, wherein the behavior of the at least one neighboring vehicle detected from the at least one perception task includes changing vehicle lanes without signaling.

13. The non-transitory computer readable storage medium of claim 11, herein the behavior of the at least one neighboring vehicle detected from the at least one perception task includes occupying multiple vehicle lanes on a road surface more than a predetermined length of time.

14. The non-transitory computer readable storage medium of claim 11, wherein the behavior of the at least one neighboring vehicle detected from the at least one perception task includes a blind-spot indicator being illuminated on the at least one neighboring vehicle.

15. The non-transitory computer readable storage medium of claim 14, wherein planning the path for the vehicle when the behavior of the at least one neighboring vehicle includes the blind-spot indicator being illuminated by directing the vehicle to a position on a vehicle lane where the blind-spot indicator on the at least one neighboring vehicle is no longer illuminated.

16. The non-transitory computer readable storage medium of claim 11, wherein the behavior of the at least one neighboring vehicle detected from the at least one perception task includes the at least one neighboring vehicle performing a predetermined number of lane changes within a predetermined length of time.

17. The non-transitory computer readable storage medium of claim 11, wherein planning the path for the vehicle based on the at least one perception task and the risk factor for the at least one neighboring vehicle includes selecting one of a plurality of possible paths that are each equally beneficial for the vehicle to reach a desired destination that maintains a predetermined distance from the at least one neighboring vehicle.

18. A system for a vehicle, the system comprising:
a drivetrain;
a power source in communication with the drivetrain;
at least one sensor:
a controller in communication with the at least one sensor and configured to:
receive a plurality of perception images of an area surrounding the vehicle with the at least one sensor;
detect at least one perception task from the plurality of perception images, wherein the at least one perception task includes identifying at least one neighboring vehicle;
calculate a risk factor for the at least one neighboring vehicle, wherein the risk factor provides a statistical likelihood that a future behavior of the at least one neighboring vehicle will pose an elevated risk to the vehicle and calculating the risk factor includes:
recognizing a behavior of the at least one neighboring vehicle detected from the at least one perception task identified from the plurality of perception images;
mapping the behavior of the at least one neighboring vehicle onto at least one of a plurality of risk-related clusters to determine the statistical likelihood that a future behavior of the at least one neighboring vehicle will pose the elevated risk; and
performing a behavior risk calculation to assign the risk factor based on at least one vehicle risk value associated with the at least one of the plurality of risk-related clusters;
plan a path for the vehicle based on the at least one perception task and the risk factor for the at least one neighboring vehicle; and
execute the path for the vehicle, wherein the vehicle is an autonomous motor vehicle.

19. The system of claim 18, wherein the behavior of the at least one neighboring vehicle detected from the at least one perception task includes the at least one neighboring vehicle performing a predetermined number of lane changes within a predetermined length of time.

20. The system of claim 18, wherein planning the path for the vehicle is based on the at least one perception task and the risk factor for the at least one neighboring vehicle includes selecting one of a plurality of possible paths that are each equally beneficial for the vehicle to reach a desired destination that maintains a predetermined distance from the at least one neighboring vehicle.

* * * * *